US012762106B2

(12) United States Patent
Li et al.

(10) Patent No.: US 12,762,106 B2
(45) Date of Patent: Oct. 13, 2026

(54) DATA PROCESSING

(71) Applicant: Beijing Youzhuju Network Technology Co., Ltd., Beijing (CN)

(72) Inventors: Zhenyu Li, Beijing (CN); Yiding Cheng, Beijing (CN); Qi Zhu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/983,848

(22) Filed: Dec. 17, 2024

(65) Prior Publication Data

US 2025/0307229 A1 Oct. 2, 2025

(30) Foreign Application Priority Data

Mar. 29, 2024 (CN) ........................ 202410382887.9

(51) Int. Cl.
*G06F 16/23* (2019.01)

(52) U.S. Cl.
CPC ...... *G06F 16/2308* (2019.01); *G06F 16/2358* (2019.01)

(58) Field of Classification Search
CPC ........................ G06F 16/2308; G06F 16/2358
USPC .......................................................... 707/610
See application file for complete search history.

(56) References Cited

U.S. PATENT DOCUMENTS

| | | | | |
|---|---|---|---|---|
| 8,863,234 | B2 * | 10/2014 | Zhuk | G06Q 10/06 709/213 |
| 9,311,378 | B2 * | 4/2016 | Subramanian | G06F 16/273 |
| 9,852,173 | B1 * | 12/2017 | Schuller | G06F 16/2365 |
| 10,275,506 | B1 * | 4/2019 | Schneider | G06F 16/27 |
| 11,435,994 | B1 * | 9/2022 | Gunda | G06F 16/25 |
| 12,326,855 | B1 * | 6/2025 | Ghodake | G06F 16/2365 |
| 12,469,092 | B2 * | 11/2025 | Moton, Jr. | G06Q 10/02 |
| 2003/0088456 | A1 * | 5/2003 | Ernest | G06Q 10/10 705/7.11 |
| 2003/0131018 | A1 * | 7/2003 | Godoy | G06Q 10/10 |
| 2010/0017442 | A1 * | 1/2010 | Kaijima | G06F 9/542 719/318 |

(Continued)

FOREIGN PATENT DOCUMENTS

| | | | |
|---|---|---|---|
| CN | 104915769 A | * | 9/2015 |
| CN | 206117727 U | | 4/2017 |

(Continued)

*Primary Examiner* — Phuong Thao Cao
(74) *Attorney, Agent, or Firm* — Alleman Hall LLP

(57) ABSTRACT

A method, apparatus, electronic device and readable medium for data processing is provided by the disclosure. The method includes: if a change of data occurs in a first service in a plurality of services of the entity, first update data of the first service is obtained; a target task corresponding to the first update data of the first service is determined from a predetermined correspondence, the correspondence indicating a business processing policy of update data of a respective service on the data bus, and the target task comprising at least one second service in the plurality of services and a second operation performed by each of the at least one second service; a corresponding second operation is performed on each of the at least one second service, to cause data on the at least one second service on the entity to match the first update data of the first service.

20 Claims, 5 Drawing Sheets

(56) References Cited

U.S. PATENT DOCUMENTS

| | | | | |
|---|---|---|---|---|
| 2014/0164539 | A1* | 6/2014 | Mastrangelo | H04L 65/1063 709/206 |
| 2015/0095973 | A1* | 4/2015 | Neumueller | H04L 63/20 726/1 |
| 2017/0063833 | A1* | 3/2017 | Colle | G06F 8/36 |
| 2018/0302276 | A1* | 10/2018 | Lu | H04L 41/08 |
| 2022/0303324 | A1* | 9/2022 | Zhang | H04L 65/61 |
| 2022/0398677 | A1* | 12/2022 | Moton, Jr. | G06Q 10/02 |
| 2024/0036968 | A1* | 2/2024 | Prakash | G06F 11/0751 |
| 2024/0126537 | A1* | 4/2024 | Miller | G06F 8/65 |

FOREIGN PATENT DOCUMENTS

| | | | | | |
|---|---|---|---|---|---|
| CN | 112988358 | A | | 6/2021 | |
| CN | 116132488 | A | * | 5/2023 | H04L 67/125 |
| CN | 116743922 | A | * | 9/2023 | H04M 3/493 |
| CN | 117785335 | A | * | 3/2024 | |
| CN | 118093226 | A | * | 5/2024 | G06Q 10/40 |
| CN | 112712086 | B | * | 11/2024 | G06F 18/214 |

* cited by examiner

DATA PROCESSING

CROSS-REFERENCE

This application claims priority to Chinese Patent Application No. 202410382887.9, filed on Mar. 29, 2024 and entitled 'METHOD AND APPARATUS, ELECTRONIC DEVICE AND READABLE MEDIUM FOR DATA PROCESSING', which is incorporated herein by reference in its entirety.

FIELD

The present disclosure relates to the field of data processing technology and, in particular, to data processing.

BACKGROUND

In entities, there are usually a variety of different services (which may also be referred to as systems) that provide a variety of different functions to users. For example, an e-commerce platform may include a recommended product service, a photographic service, a managing service, etc., wherein the recommended product service provides the user with the functions of product selection and product recommendation, the photographic service provides the user with the function of photography, and the managing service provides the user with the functions of quality, warehousing, and further management.

However, each of the multi-services maintains its own business processing logic, and different services are likely to process the data of the same object, and the processing of data by one service may need to cause further services to perform related processing on that data, and as the number of services included in the entity continues to increase, such a complex data processing process is likely to result in a conflict in the processing of the data.

SUMMARY

In order to solve the described technical problem, the present disclosure provides a present a method, apparatus, electronic device and readable medium for data processing capable of decoupling a business processing logic of a plurality of services belonging to a single entity from a data processing process, and guaranteeing the accuracy of the data processing.

In order to implement the described aim, the technical solution provided in the present disclosure is as follows.

According to a first aspect, the present disclosure provides a method of data processing, applied to a data bus in an entity, including: if a change of data occurs in a first service in a plurality of services of the entity, obtaining first update data of the first service; determining, from a predetermined correspondence, a target task corresponding to the first update data of the first service, the correspondence indicating a business processing policy of update data of a respective service on the data bus, and the target task including at least one second service in the plurality of services and a second operation performed by each of the at least one second service; performing a corresponding second operation on each of the at least one second service, to cause data on the at least one second service on the entity to match the first update data of the first service.

In a possible implementation, the at least one second service includes all services on the entity, and the second operation is an operation for broadcasting the first update data; or the at least one second service includes at least one database on the entity, and the second operation is an operation for saving the first update data; or the at least one second service includes at least one specified service on the entity, and the second operation is an operation for synchronizing the first update data.

In a possible implementation, the method further includes: saving update details of the first update data, the update details including at least one piece of the following information: an update time, update content, an update operator, or a service in which an update occurs; in response to a query request, obtaining update details of second update data, the query request including at least one piece of information in update details of the second update data; displaying the update details of the second update data.

In a possible implementation, before the determining, from a predetermined correspondence, a target task corresponding to the first update data of the first service, the method further includes: determining the predetermined correspondence based on a business processing logic of each service of the plurality of services and an association relationship between data of the plurality of services, the predetermined correspondence including a first correspondence, and the first correspondence including a correspondence between the first update data of the first service and the target task.

In a possible implementation, before the determining, from a predetermined correspondence, a target task corresponding to the first update data of the first service, the method further includes: defining a data status for each service of the plurality of services; establishing a correspondence between a data status change of each service of the plurality of services and a task required to be performed as the predetermined correspondence, the predetermined correspondence including a first correspondence, and the first correspondence including a correspondence between a status change corresponding to the first update data of the first service and the target task.

In a possible implementation, if a change in data occurs in a first service in a plurality of services of the entity, obtaining first update data of the first service includes: in response to monitoring a change of data in a database of the first service, determining the first update data based on the changed data in the database of the first service.

In a possible implementation, the first service is a producer or consumer of data in the entity, and the second service is a producer or consumer of data in the entity.

According to a second aspect, the present disclosure further provide an apparatus for data processing, applied to a data bus in an entity, including: an obtaining unit configured to, if a change of data occurs in a first service in a plurality of services of the entity, obtain first update data of the first service; a determining unit configured to determine, from a predetermined correspondence, a target task corresponding to the first update data of the first service, the correspondence indicating a business processing policy of update data of a respective service on the data bus, and the target task including at least one second service in the plurality of services and a second operation performed by each of the at least one second service; and a performing unit configured to perform a corresponding second operation on each of the at least one second service, to cause data on the at least one second service on the entity to match the first update data of the first service.

In a possible implementation, the at least one second service includes all services on the entity, and the second operation is an operation for broadcasting the first update data; or the at least one second service includes at least one database on the entity, and the second operation is an operation for saving the first update data; or the at least one second service includes at least one specified service on the entity, and the second operation is an operation for synchronizing the first update data.

In a possible implementation, manner, the apparatus further includes: a saving unit configured to save update details of the first update data, the update details including at least one piece of the following information: an update time, update content, an update operator, or a service in which an update occurs; a querying unit configured to, in response to a query request, obtaining update details of second update data, the query request including at least one piece of information in update details of the second update data; a display unit configured to display the update details of the second update data.

In a possible implementation, manner, the apparatus further includes: an establishing unit configured to, before the determining, from a predetermined correspondence, a target task corresponding to the first update data of the first service, determine the predetermined correspondence based on a business processing logic of each service of the plurality of services and an association relationship between data of the plurality of services, the predetermined correspondence including a first correspondence, and the first correspondence including a correspondence between the first update data of the first service and the target task.

In a possible implementation, manner, the apparatus further includes: a defining unit configured to define a data status for each service of the plurality of services before the determining, from a predetermined correspondence, a target task corresponding to the first update data of the first service; a suggesting unit configured to establish a correspondence between a data status change of each service of the plurality of services and a task required to be performed as the predetermined correspondence, the predetermined correspondence including a first correspondence, and the first correspondence including a correspondence between a status change corresponding to the first update data of the first service and the target task.

In a possible implementation, the obtaining unit is specifically configured to: in response to monitoring a change of data in a database of the first service, determine the first update data based on the changed data in the database of the first service.

In a possible implementation, the first service is a producer or consumer of data in the entity, and the second service is a producer or consumer of data in the entity.

It would be appreciated that, the specific implementation of the apparatus and the technical effect achieved may be found in the relevant description of the method provided in the first aspect or any of the implementations of the first aspect.

In a third aspect, the present disclosure further provides an electronic device. The electronic device includes: a processor and a memory; the memory is configured to store instructions or a program; the processor is configured to execute the instructions or the program in the memory, to cause the electronic device to perform the method provided by any implementation of the foregoing target aspect or target aspect.

In a fourth aspect, the present disclosure further provides a readable medium, where the readable medium stores instructions or a program which, when run on a processor, cause the processor to perform the method provided in any implementation of the foregoing objective aspect or objective aspect.

Compared with the prior art, the embodiments of the present disclosure have at least the following advantages.

The technical solution provided in the present disclosure provides a method of data processing. The method is applied to a data bus in an entity (such as an electronic commodity platform). For example, the method may include: firstly, if a change of data occurs in a first service in a plurality of services of the entity, obtaining first update data of the first service; then, determining, from a predetermined correspondence, a target task corresponding to the first update data of the first service, the correspondence indicating a business processing policy of update data of a respective service on the data bus, and the target task including at least one second service in the plurality of services and a second operation performed by each of the at least one second service; further, performing a corresponding second operation on each of the at least one second service, to cause data on the at least one second service on the entity to match the first update data of the first service. In this way, different services only need to maintain their own business processing logic and implement the purpose of transmitting the update data of any service to other services through the data bus added by the entity, without the need for each service to consider the impact of the data update of the service on other services. The relationship between the business processing logic and the data processing process of a plurality of services belonging to a single entity is decoupled, the data processing process within an entity including a plurality of services is simplified, the problem of conflicts occurring with respect to the processing of data is overcome, and the accuracy of the data processing is ensured on the basis of improving the efficiency of the data processing. The data bus implementing the method of data processing connects a plurality of services of the entity and is capable of interacting with all of the plurality of services of the entity, and the predetermined correspondence enables the effect of update data of each service on other services of the entity.

BRIEF DESCRIPTION OF THE DRAWINGS

T In order to more clearly illustrate the technical solutions in the embodiments or prior art of the present disclosure, the following will briefly introduce the accompanying drawings that need to be used in the description of the embodiments or prior art. It is obvious that the accompanying drawings in the following description are only some of the embodiments recorded in the present application, and for the person of ordinary skill in the field, other accompanying drawings may be obtained according to these drawings without creative labor.

DETAILED DESCRIPTION

Due to the operational nature of supply chain related entities such as e-commerce platforms, there is an increasing demand for real-time, accurate, and consistent data. Many different services (also referred to as systems) within the entity need to access and manipulate the data, which requires the entity to process the data quickly, accurately, and securely in a highly concurrent and distributed environment.

Figure 1:
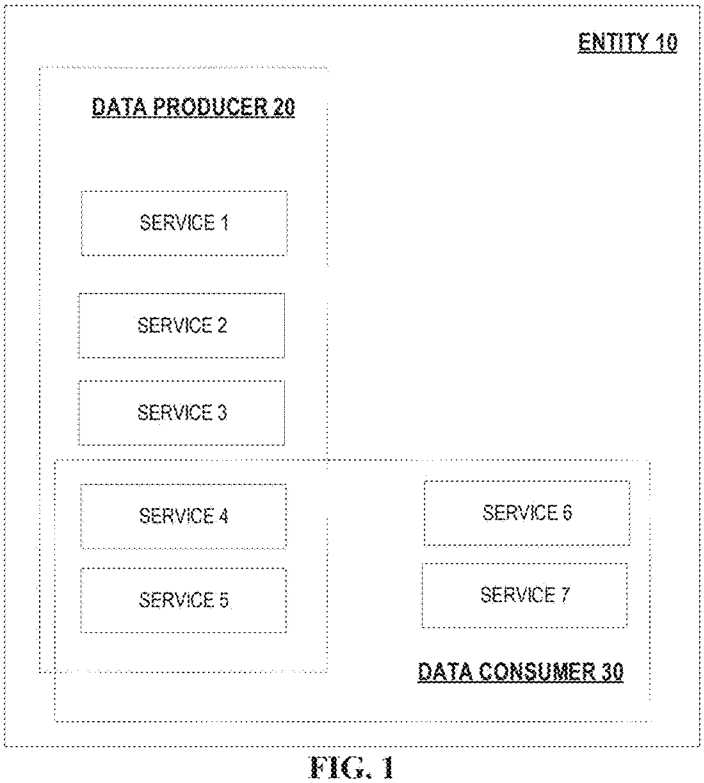
FIG. 1 is a schematic diagram of a current entity architecture.

Currently, the architecture of the entity may be shown, for example, in FIG. 1. An entity 10 includes a plurality of services: a service 1, a service 2, . . . , a service N, N being an integer greater than 1. In the service 1~the service N, the service that generates data may be classified to a data producer 20, the service that reads data may be classified to a data consumer 30, and some services may belong to both the data producer 20 and the data consumer 30. The service 1 to a service 5 are illustrated in FIG. 1 as an example belonging to the data producer 20, and a service 4 to a service 7 belonging to the data consumer 30. Therein, taking the entity as an e-commerce platform as an example, the services in the data producer 20 may, for example, include, but are not limited to: a recommended product service, a managing service, or a photographic service, and the services in the data consuming party 30 may, for example, include, but are not limited to: a Warehouse Management System (WMS), a logistics service, or a commodity intermediate station.

Taking FIG. 1 as an example, it may be seen that the current entity, the way of processing the data, has plurality of problems such as large concurrency, complex data, wide distribution of services, and fast subsequent data iteration, etc., and the process of processing the data by different services respectively is prone to cause conflict of data, and the real-time and consistency of the data may not be guaranteed. For example, the service 1 modifies the value of an attribute 1 of an object 1 (e.g., a product in an e-commerce platform) to a, while the service 2 modifies the value of the attribute 1 of the object 1 to b. Thus, when the service 1 synchronizes its modification of the value of the attribute 1 of the object 1 to the service 2, the service 2 does not know whether it would keep the value of the attribute 1 of the object 1 as b or modify the value of the attribute 1 of the object 1 to a based on the modification of the service 1.

Moreover, since certain data processing processes between services are coupled to a certain extent, the processing of data by one service has to consider the impact on other services, which not only makes the design of the service itself quite complex, but also leads to difficulties in upgrading and maintaining the services within the entity. For example, if the value of the attribute 1 of the object 1 in the service 1 is a, and if the service 2 would like to change the value of the attribute 1 of the object 1 to b, it is necessary to combine the value a of the attribute 1 of the object 1 in the service 1, and consider whether it is possible to perform the operation of 'change the value of the attribute 1 of the object 1 to b'.

In addition, if a service, as a data consumer, would like to obtain the data of a certain object, it needs to understand the business processing logic of each service within the entity to be able to specify from which service the data of the object it wants to obtain would be obtained. Otherwise, it may not be possible to quickly obtain the data of the object wanted, or the data of the object obtained may not be the latest data of the object. It may be seen that the current architecture of the entity is very unfriendly to the services of the data consumer. For example, the value of an attribute 2 of an object 2 in the service 1 is b. After the service 1 modifies the value of the attribute 1 of the object 1 to a, it synchronizes the latest value of the attribute 1 of the object 1—a to the service 2; and the service 2 modifies the value of the attribute 2 of the object 2 to c based on the value a of the attribute 1 of the object 1. And at this time, the service 4 would like to obtain the value of the attribute 2 of the object 2. Then, the service 4 may obtain the value of the attribute 2 of the object 2 from the service 1 as well as the value of the attribute 2 of the object 2 from the service 2. However, the service 4 must appreciate that the modification of the value of the attribute 1 of the object 1 by the service 1 triggers the modification of the value of the attribute 2 of the object 2 in the service 2, in order to be able to determine that the value of the attribute 2 of the object 2 in the service 2 is up-to-date, and thus to obtain the up-to-date value of the attribute 2 of the object 2, c, from the service 2, instead of obtaining the value of the attribute 2 of the object 2, b, from the service 1.

Moreover, in the current entity architecture, each service will only synchronize the latest data of the object to the intermediate station so that the intermediate station may provide users with the function of querying the data of the object. However, the respective services will not synchronize the details of the process of generating and modifying the data of the object to the intermediate station, which results in the intermediate station not managing and recording all the data of the object in a unified way, which makes it difficult to maintain the completeness and accuracy of the data of the object, and to locate and solve the problems in the data.

Based on this, the embodiments of the present disclosure provide a method of data processing, which is applied to a data bus that connects a plurality of services in the entity. That is, in the embodiments of the present disclosure, an intermediate layer, the data bus, is constructed in the entity to implement data interaction between the plurality of services. For example, the method may include: firstly, if a change of data occurs in a first service in a plurality of services of the entity, obtaining first update data of the first service; then, determining, from a predetermined correspondence, a target task corresponding to the first update data of the first service, the correspondence indicating a business processing policy of update data of a respective service on the data bus, and the target task including at least one second service in the plurality of services and a second operation performed by each of the at least one second service; further, performing a corresponding second operation on each of the at least one second service, to cause data on the at least one second service on the entity to match the first update data of the first service.

In this way, different services only need to maintain their own business processing logic and implement the purpose of transmitting the update data of any service to other services through the data bus added by the entity, without the need for each service to consider the impact of the data update of the service on other services. The relationship between the business processing logic and the data processing process of a plurality of services belonging to a single entity is decoupled, the data processing process within an entity including a plurality of services is simplified, the problem of conflicts occurring with respect to the processing of data is overcome, and the accuracy of the data processing is ensured on the basis of improving the efficiency of the data processing. In addition, as a data bus connecting a plurality of services within the entity, it is also capable of performing functions such as caching, load balancing, scaling, etc., which improves the performance of the entity.

It would be appreciated that the data bus hides the specific implementation details of the underlying database in different services, abstracts data processing into a series of tasks, decouples the direct relationship between the service and the data, improves the efficiency of data processing, and ensures the real-time and consistency of the data. The data bus, as an intermediate layer channel between different services and data, may also accomplish caching, load balancing, scaling and other functions to improve the performance of the entity. It may be seen that the data bus is the core architecture of data processing and control for the application, service and storage layers of entities such as e-commerce platforms. The emergence of data bus has a significant role in promoting the rapid flow and safe and effective management of data of e-commerce platforms and other entities.

Figure 2:
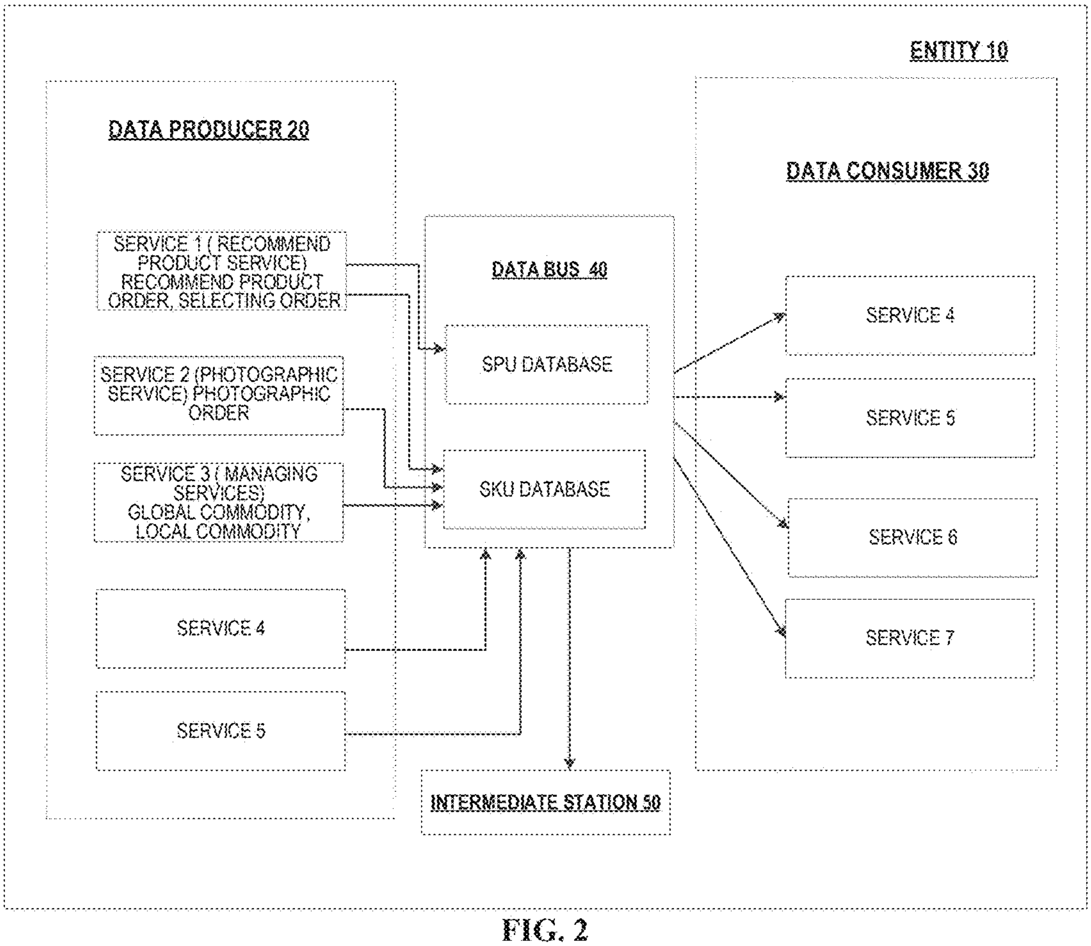
FIG. 2 is a schematic diagram of an entity architecture according to an embodiment of the present disclosure.

FIG. 2 illustrates a schematic diagram of a possible entity architecture according to an embodiment of the present disclosure. As shown in FIG. 2, the entity 10 includes: a data bus 40 and a plurality of services. The plurality of services may include, for example, the service 1, the service 2, . . . , and the service N, wherein N is an integer greater than 1. An example is illustrated in FIG. 2 with N=7, the service 1, the service 5 belongs to the data producer 20, and the service 4, the service 7 belongs to the data consumer 30. The data bus 40 connects to each service of the data producer 20 and monitors each service of the data producer 20 for updated data; at the same time, the data bus 40 also connects to each service of the data consumer 30, and each service of the data consumer 30 is able to obtain the required data directly from the data bus 40. Moreover, the data bus 40 also synchronizes the update details corresponding to the update data of all the services to the intermediate station 50, which is capable of uniformly managing and recording the update details of the various objects, making it possible for maintaining the completeness and accuracy of the data, and for locating and solving data problems.

Thus, on the one hand, the data bus 40 is internally capable of converting different business processing logics from different services into a unified data processing logic through a series of conversion functions, avoiding cumbersome compatibility processing among various services and greatly reducing the complexity of the design of the business processing logic within the services of the entity. On the other hand, the data bus 40 establishes correspondence between changes of data (including modification of data content and changes of data status) and tasks, ensuring that when the content or status of the data changes, the data bus 40 may automatically determine the corresponding task and trigger the task, decoupling the dependence on each service. This makes it unnecessary for each service to consider the interplay of their business processing logic, and only need to focus on their own business processing logic, which in turn improves the overall operational efficiency of the entity. That is to say, by abstracting the complex business processing logic into a series of update data and tasks and separating the data processing from the business processing logic of each service, the data bus 40 not only improves the flexibility, scalability and stability of the service, but also simplifies the business processing logic of the service. On the other hand, since all the processing corresponding to the update data in the architecture of this entity is executed in the data bus 40, the monitoring and recording of the update behavior of all the data may be implemented in the data bus 40. When changes are made to the data of an object, the data bus 40 needs to capture these changes and generate a record of the corresponding update details in the data bus 40. The data bus 40 also provides the function of querying the data records, enabling the user to easily find the records related to all the update details of a particular data. The function of querying data records may correspond to a flexible query system on the data bus 40 that allows a user to query data records in a variety of ways, for example, by conditions such as an update time, update content, or a service in which an update occurs.

It would be appreciated that the subject for implementing the method of data processing may be the apparatus for data processing provided by an embodiment of the present application. The apparatus for data processing may be hosted in an electronic device or a functional module of an electronic device. The apparatus for data processing may, for example, be a data bus of an entity (e.g., a certain e-commerce platform), or, alternatively, may be a functional module on the data bus of the entity capable of implementing the data processing function provided by the embodiments of the present application.

Figure 3:
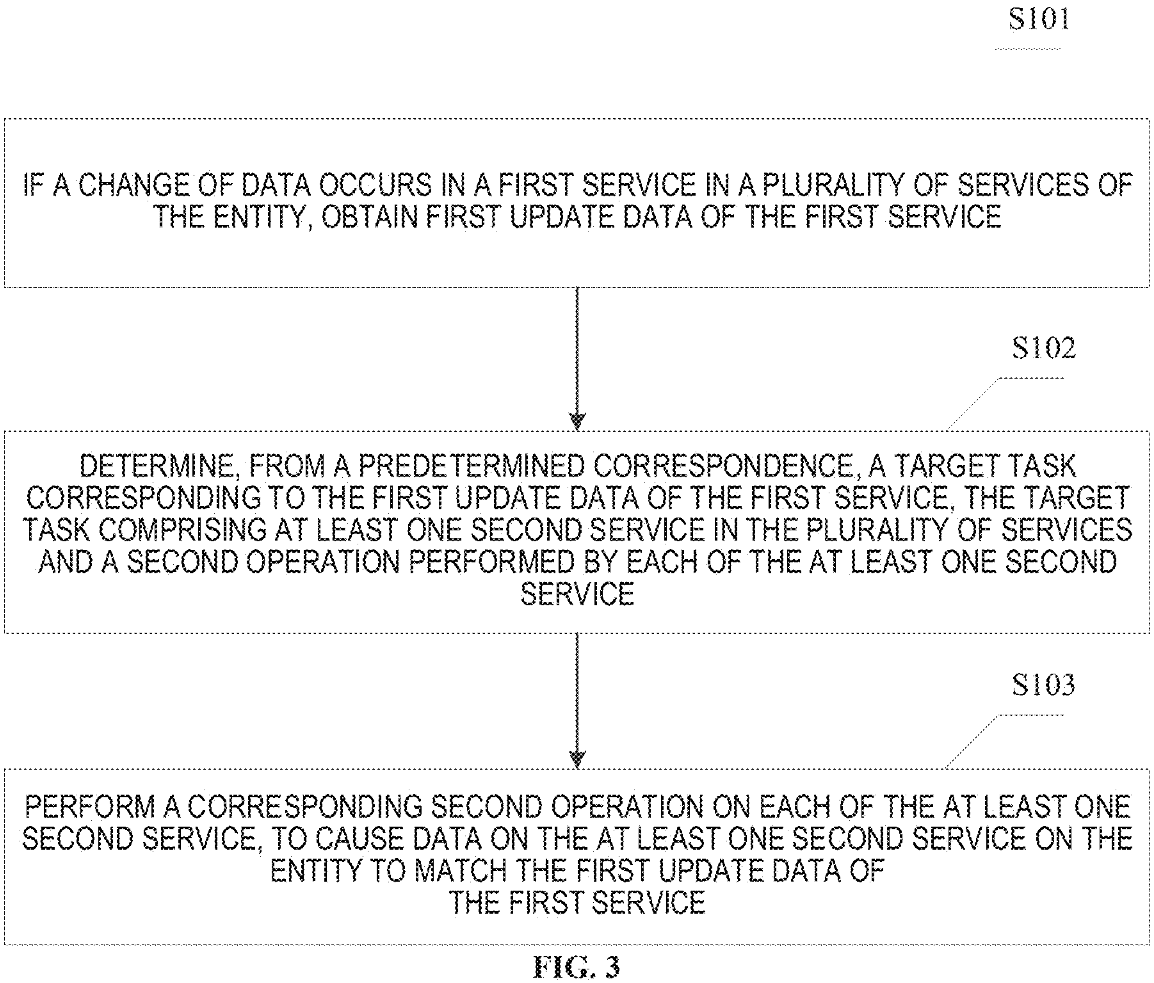
FIG. 3 is a schematic flowchart of a method of data processing according to an embodiment of the present disclosure.

FIG. 3 is a schematic flowchart of a method of data processing according to an embodiment of the present disclosure. The method may be applied to an apparatus for data processing, and the apparatus for data processing may be, for example, an apparatus 600 for data processing shown in FIG. 6. Alternatively, it may be considered that the method may be applied to a data bus that is separately connected to a plurality of services of the entity to enable interaction with the plurality of services, which may be, for example, the data bus 40 shown in FIG. 2 below.

As shown in FIG. 3, the method, for example, may include the following steps S101-S103.

S101: if a change of data occurs in a first service in a plurality of services of the entity, obtain first update data of the first service.

The service may refer to functional modules that belong to an entity and are configured to implement corresponding functions. The plurality of services in S101 refer to functional modules that belong to a same entity and are configured to implement different functions respectively. The entity may refer to a comprehensive platform including a plurality of services, such as an e-commerce platform, and the first service may generally refer to at least one service on which data update occurs among the plurality of services of the entity.

A change of data may refer to a change in the content of the data or a change in the status of the data. Accordingly, then, the first update data of the first service may be data that indicates a change in the data content of the first service or data that indicates a change in the status of the first service. For example, for the case where the entity is an e-commerce platform A, the first service may be a recommended product service, and the first data update for the recommended product service may refer to a change in the value of the attribute 1 on the recommended product document or the selected product document of the object 1. The first update data may, for example, be data indicating that the value of the attribute 1 on the recommended product document or the selected product document of the object 1 has been modified from a to b; or, the first data update for the recommended product service may refer to a change in the status of the recommended product document or the selected product document of the object 1, and the first update data may for example be data indicating that the status on the recommended product document or the selected product document of the object 1 has changed to success.

In some possible implementations, in order to avoid the impact of the data bus on the business processing logic of the respective services, the business processing logic of the service itself is not affected as far as possible; therefore, in the embodiments of the present disclosure, it is not necessary to broadcast or report the corresponding update data to the data bus, but rather the data bus will check the corresponding databases of each service in real time or periodically, or monitor each service to see if the data update event occurs.

As an example, S101 may include: in response to monitoring a change of data in a database of the first service, determining the first update data based on the changed data in the database of the first service.

For the database of the service, for example, as shown in FIG. 2, the data bus 40 may include a Standard Product Unit (SPU) database and a minimum Stock Keeping Unit (SKU) database. Assuming that the service 1 is a recommended product service including 'recommended product order' and 'selected product order', the service 2 corresponds to a photographic service including 'photographic order', a service 3 corresponds to a managing service including 'global commodity' and 'local commodity'. The contents recorded in the SPU database include data related to the category and material of the object, and the contents recorded in the SKU database include data related to the size and color of the object. The update of data related to 'recommended product order' and 'selected product order' included in the recommended product service will affect the SPU database and the SKU database; the 'photographic order' in the photographic service will only affect the SKU database (specifically the pictures of the objects in the SKU database) and will not affect the SPU database; the 'global commodity' and 'local commodity' in the managing service will only affect the SKU database and will not affect the SPU database. It would be appreciated that the data bus 40 may also include further databases.

S102: determine, from a predetermined correspondence, a target task corresponding to the first update data of the first service, wherein the target task including at least one second service in the plurality of services and a second operation performed by each of the at least one second service.

S103: perform a corresponding second operation on each of the at least one second service, to cause data on the at least one second service on the entity to match the first update data of the first service.

It would be appreciated that S103 may be understood as: performing a target task, wherein the target task is configured to implement an impact of update data of the first service on at least one second service of the entity.

The predetermined correspondence may be understood as a basis for a business processing strategy designed within the data bus in embodiments of the present disclosure that uses update data to drive the data bus. The predetermined correspondence may cover a mapping relationship between different update data and corresponding tasks in various services within the entity for determining the tasks that would be performed by the data bus when different update data is generated by the various services.

The target task is a task that corresponds to the first update data of the first service in the predetermined correspondence, and is also a task that needs to be performed by the data bus after the occurrence of the first update data of the first service.

As an example, the predetermined correspondence may include a correspondence between the first update data of the first service and a broadcasting task, then the target task may be to broadcast the first update data, wherein the at least one second service includes all the services on the entity, and the second operation is an operation of broadcasting the first update data. S103 may include, for example, broadcasting the first update data in the entity such that all other services of the entity update data based on the first update data. In this way, the first update data of the first service may be synchronized and updated to the other services of the entity, so that the other services may perceive and adapt their own data based on it. Therein, a second service that receives the first update data broadcast by the data bus may adapt its own data based on that first update data. It would be appreciated that although the second service adaptively adjusts its own data based on the broadcasted first update data, the data of that second service also changes, the second service may not be recognized as the first service in S101 to avoid that the same update data will be repeatedly recorded and broadcast by the data bus.

As a further example, the predetermined correspondence may include a correspondence between the first update data of the first service and the at least one database on the data bus, then the target task may be to update that at least one database, wherein the at least one second service includes the at least one database on the entity, and the second operation is an operation to save the first update data; S103 may for example include: updating the at least one database on the data bus based on that first update data. In this way, through the unified business processing logic (which may also be referred to as a data model) maintained within the data bus, through a series of conversion functions, different business processing logics from different services may be converted to this unified business processing logic, and the update data of different services may be embodied in the various databases on the data bus, facilitating the reading of the required data by the various services of the subsequent data consumers.

As a further example, the predetermined correspondence may include a correspondence between the first update data of the first service and a specified service among the plurality of services, then the target task may be to synchronize the update data to the specified service, wherein the at least one second service includes at least one specified service on the entity, and the second operation is an operation to synchronize the first update data; S103 may for example include: synchronizing the first update data to the specified service. In this way, the update data of each service may be managed and recorded to the designated service (e.g., WMS or intermediate station) in a unified manner, which makes the recording of the data completer and more comprehensive, which makes it possible to locate and solve the data problem, and provides a basis for recording and querying the entirety of the data-related content.

For example, the predetermined correspondence includes 10 specific correspondences: correspondence 1 to correspondence 10, wherein correspondence 1 includes a correspondence between an update data 1 of the service 1 and a task 1, correspondence 2 includes a correspondence between an update data 2 of the service 1 and a task 2, and correspondence 3 includes a correspondence between an update data 3 of the service 2 and task 3. Then, if the first service obtained by S101 is the service 1 and the first update data is the update data 1, the target task determined in S102 is the task 1; if the first service obtained by S101 is the service 1 and the first update data is the update data 2, the target task determined in S102 is the task 2; and if the first service obtained by S101 is the service 2 and the first update data is the update data 3, then the target task identified in S102 is task 3.

The predetermined correspondence may be understood as a business processing strategy for indicating update data on the data bus for each service.

Before S102, the embodiment of the present disclosure may further include: a step of establishing a predetermined corresponding relationship. As an example, establishing a predetermined correspondence may include: determining the predetermined correspondence based on a business processing logic of each service of the plurality of services and an association relationship between data of the plurality of services, the predetermined correspondence including a first correspondence, and the first correspondence including a correspondence between the first update data of the first service and the target task. As a further example, establishing the predetermined correspondence may include: defining a data status for each service of the plurality of services; establishing a correspondence between a data status change of each service of the plurality of services and a task required to be performed as the predetermined correspondence, the predetermined correspondence including a first correspondence, and the first correspondence including a correspondence between a status change corresponding to the first update data of the first service and the target task. In this way, a correspondence is established and saved in advance, thereby providing a basis for the S102 to automatically determine a target task, and enabling efficient data processing in the embodiments of the present disclosure.

In the embodiment of the present disclosure, the predetermined correspondences in the data bus would be appreciated as a set of effective business processing strategies (also known as data processing mechanisms), which may greatly simplify the operation of services, allowing each service to focus only on its own business processing logic and data changes. Before establishing the predetermined correspondence, it is necessary to define and standardize the data content and status, in which the status describes the position or stage of the data of the object in the business processing logic, and the status may be, for example: completed, posted, selected for ordering, to be put on the shelves, and so on, and each status corresponds to at least one possible subsequent event and action (i.e., the task referred in this specification).

It would be appreciated that S102-S103 may be a step that is automatically triggered after the first update data of the first service is obtained in S101.

In some possible implementations, in order to avoid the impact of the data bus on the business processing logic of respective services, the business processing logic of the service itself is not affected as much as possible. Therefore, in the embodiments of the present application, the update data broadcast externally by each service may be automatically processed by the data bus, which triggers the execution of the corresponding target task, thereby decoupling the dependence between each service, reducing the burden of the service itself. Thus, each service does not need to deal with the business processing logic of each other, and only needs to focus on its own business processing logic, which in turn improves the overall operational efficiency of the entity.

Figure 4:
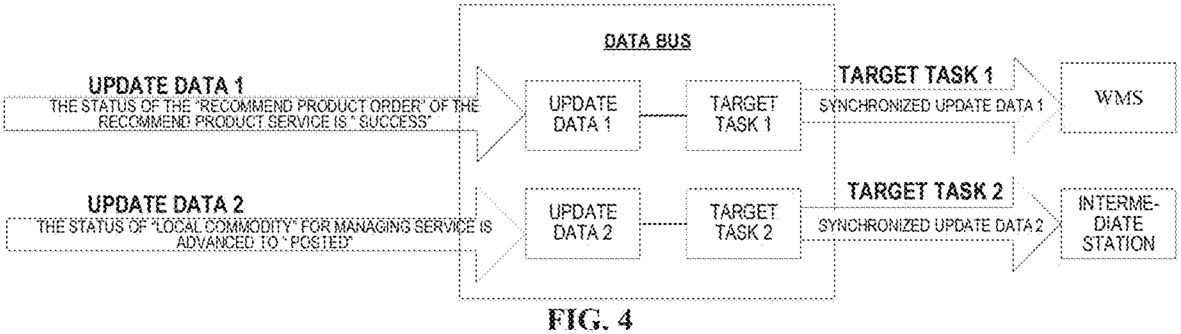
FIG. 4 is a schematic diagram of an example of a method of data processing according to an embodiment of the present disclosure.

For example, as shown in FIG. 4, if the update data 1 of the first service corresponds to the status of the 'recommended product order' of the recommended product service as 'Success', then the target task 1 determined on the basis of S102 may include synchronizing the update data 1 to the WMS. In this way, the recommended product service itself does not need to know the other services that need to be triggered by the update data 1, and the target task to be triggered by the other services, and the update data 1 may be uniformly processed by the data bus, i.e., the data bus determines the target task 1 based on the predetermined correspondence and automatically triggers the execution of the target task 1. Similarly, if the update data 2 of the first service corresponds to the status of the 'local commodity' of the management service as 'posted', then the target task 2 determined based on S102 may include synchronizing the update data 2 to the intermediate station. In this manner, the managing service itself does not need to know the other services that need to be triggered by the update data 2, and the target task 2 that triggers the execution of the other services, and the update data 2 may be uniformly processed by the data bus, i.e., the data bus determines the target task 2 based on the predetermined correspondence, and automatically triggers the execution of the target task 2.

In some possible implementations, the data bus may also record each change of data so as to be traceable upon subsequent maintenance and queries.

As an example, the method provided in the embodiment of the present disclosure may further include: saving update details of the first update data, the update details are configured to describe in detail the situation related to this first update data, and the update details may include at least one of the following information: an update time, update content, an update operator, or a service in which an update occurs. Assuming that update data is the first update data of the first service, the method may further include: in response to a query request for the first update data for the first service, obtaining and displaying update details of the first update data, the query request may include at least one piece of information in the update details of the first update data. Alternatively, when the user would like to query the second update data, then the method may further include: in response to the query request, obtaining and displaying the update details of the second update data, the query request may include at least one piece of information in the update details of the second update data. In this way, the data bus may record a more detailed data processing process and provide a data query function, making it possible to conveniently and quickly query the relevant situation of the data from the data bus.

As each service generates update data, in addition to the service's own business processing logic, the processing of the update data is executed in the data bus, which may include, for example, the addition, deletion, modification, and other operations of the data, making it possible to monitor and record all the update data in the data bus. The data bus generates a corresponding record for the captured update data, and the content of the record would be appreciated as the above update details. Taking the modification of the update data against the data as an example, the update details may include, but are not limited to: the modified content, the modified time, the modified target service, the executor of the modification operation, the modified reason, and so on.

Figure 5:
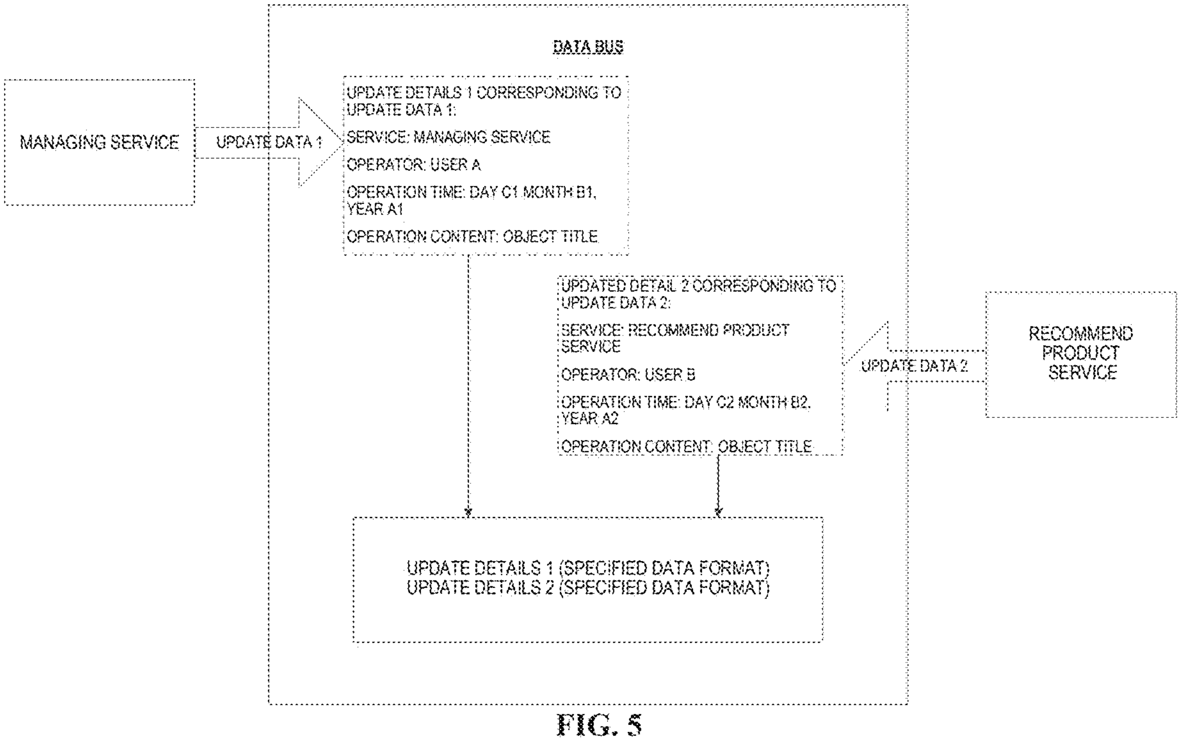
FIG. 5 is a schematic diagram of a further example of a method of data processing according to an embodiment of the present disclosure.

For example, as shown in FIG. 5, the data bus may record update details 1 of the modification of the object title on the management service by user A on day c1 month b1, year a1 and may also record update details 2 of the modification of the object title on the recommended product service by user B on day c2 month b2, year a2. Therein, the update details recorded on the data bus may be saved in accordance with a data format specified on the data bus.

It would be appreciated that objects in the embodiments of the present disclosure may refer to targets in an entity that are provided to a user for editing, which may be, for example, commodities or services on an electronic goods platform that are provided to shelves for editing and shelving.

In some possible implementations, in order to avoid the influence of the data bus on the business processing logic of each service, and to do as much as possible without affecting the business processing logic of the service itself, so usually the operations performed by the data bus in the embodiments of this application do not affect the business processing logic to be performed by the first service itself with respect to the first update data, and both may be performed at the same time. However, if the first service needs to ensure strict synchronization of data through distributed transactions or synchronization interfaces, after the first service generates the first update data, the method provided in the embodiments of the present disclosure may be executed by the data bus first, and the first service is triggered to execute the business processing logic corresponding to the first update data only when the data bus succeeds in executing the target task.

It may be seen that, by means of the method, different services only need to maintain their own business processing logic, and the new data bus in the entity implements the purpose of transmitting the update data of any one service to other services without requiring each service to consider the impact of the service's data update on other services. The relationship between the business processing logic of a plurality of services belonging to an entity and the data processing process is decoupled, the data processing process within the entity including a plurality of services is simplified, and the problem of conflicting data processing of objects is overcome. Thus, the cumbersome compatibility processing between services may be effectively avoided and the complexity of the services is greatly reduced, and the efficiency of the data processing is improved on the basis of the data processing efficiency, and the accuracy of the data processing is guaranteed.

Figure 6:
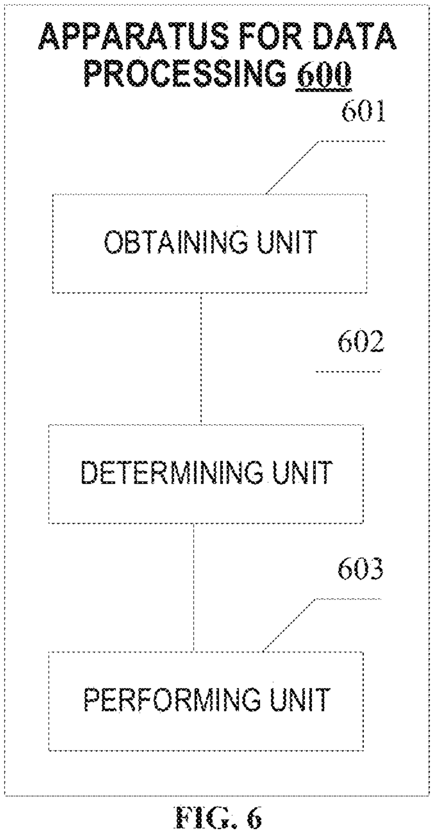
FIG. 6 is a schematic structural diagram of an apparatus for data processing 600 according to an embodiment of the present disclosure.

Accordingly, the embodiment of the present disclosure also provides an apparatus 600 for data processing, as shown in FIG. 6. The apparatus 600 is applied to a data bus of an entity. The apparatus 600 for data processing may include: an obtaining unit 601 configured to, if a change of data occurs in a first service in a plurality of services of the entity, obtain first update data of the first service; a determining unit 602 configured to determine, from a predetermined correspondence, a target task corresponding to the first update data of the first service, the correspondence indicating a business processing policy of update data of a respective service on the data bus, and the target task including at least one second service in the plurality of services and a second operation performed by each of the at least one second service; and a performing unit 603 configured to perform a corresponding second operation on each of the at least one second service, to cause data on the at least one second service on the entity to match the first update data of the first service.

In a possible implementation, the at least one second service includes all services on the entity, and the second operation is an operation for broadcasting the first update data; or the at least one second service includes at least one database on the entity, and the second operation is an operation for saving the first update data; or the at least one second service includes at least one specified service on the entity, and the second operation is an operation for synchronizing the first update data.

In a possible implementation, the apparatus 600 further includes: a saving unit configured to save update details of the first update data, the update details including at least one piece of the following information: an update time, update content, an update operator, or a service in which an update occurs; a querying unit configured to, in response to a query request, obtain update details of second update data, the query request including at least one piece of information in update details of the second update data; a display unit configured to display the update details of the second update data.

In a possible implementation, manner, the apparatus 600 further includes: an establishing unit configured to, before the determining, from a predetermined correspondence, a target task corresponding to the first update data of the first service, determine the predetermined correspondence based on a business processing logic of each service of the plurality of services and an association relationship between data of the plurality of services, the predetermined correspondence including a first correspondence, and the first correspondence including a correspondence between the first update data of the first service and the target task.

In a possible implementation, manner, the apparatus 600 further includes: a defining unit configured to define a data status for each service of the plurality of services before determining, from a predetermined correspondence, a target task corresponding to the first update data of the first service; a suggesting unit configured to establish a correspondence between a data status change of each service of the plurality of services and a task required to be performed as the predetermined correspondence, the predetermined correspondence including a first correspondence, and the first correspondence including a correspondence between a status change corresponding to the first update data of the first service and the target task.

In a possible implementation, manner, the obtaining unit 601 is specifically configured to: in response to monitoring a change of data in a database of the first service, determine the first update data based on the changed data in the database of the first service.

In a possible implementation, the first service is a producer or consumer of data in the entity, and the second service is a producer or consumer of data in the entity.

It would be appreciated that, for a specific implementation of the apparatus 600 and a technical effect achieved by the apparatus 600, reference may be made to the related description of the method shown in FIG. 3.

In addition, the embodiments of the present disclosure further provide an electronic device. The device includes: a processor and a memory; the memory is configured to store instructions or a program; the processor is configured to execute the instructions or the program in the memory, to cause the electronic device to perform any implementation of the method provided in the embodiments of the present disclosure.

Figure 7:
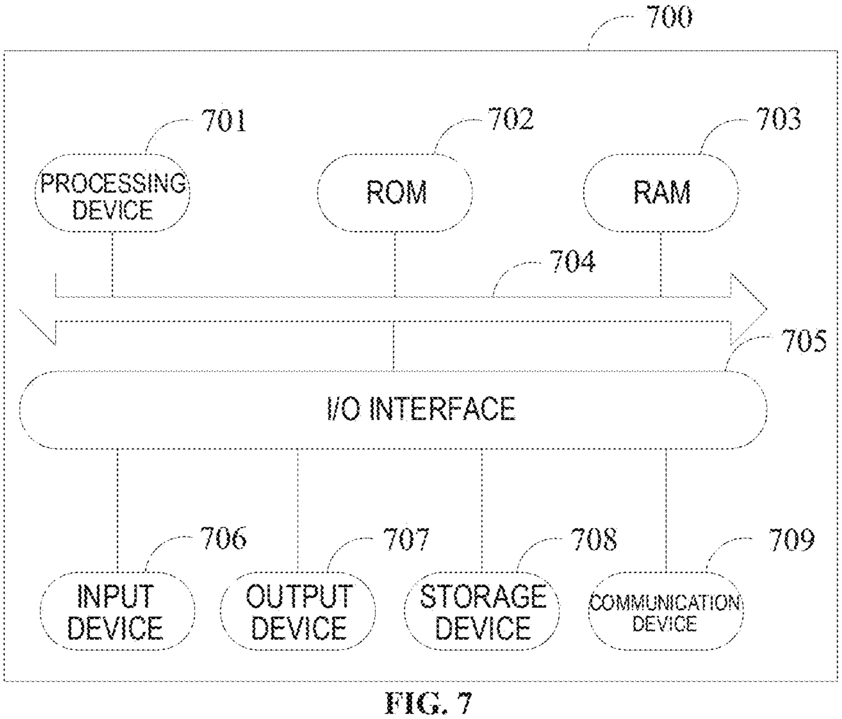
FIG. 7 is a schematic structural diagram of an electronic device 700 according to an embodiment of the present disclosure.

Referring to FIG. 7, a block diagram of an electronic device 700 suitable for implementing embodiments of the present disclosure is provided. The terminal device in the embodiment of the present disclosure may include, but is not limited to, a mobile terminal such as a mobile phone, a laptop computer, a digital broadcast receiver, a PDA (Personal Digital Assistant), a PAD (tablet computer), a PMP (Portable Multimedia Player), an in-vehicle terminal such as an in-vehicle navigation terminal, and the like, and a fixed terminal such as a digital TV, a desktop computer, and the like. The electronic device shown in FIG. 7 is merely an example and would not bring any limitation to the functions and scope of use of embodiments of the present disclosure.

As shown in FIG. 7, the electronic device 700 may include a processing device (e. g., central processor unit, graphics processor, etc.) 701 that may perform various suitable actions and processes in accordance with a program stored in read only memory (ROM) 702 or a program loaded into random access memory (RAM) 703 from storage device 708. In RAM 703, various programs and data necessary for the operation of the electronic device 700 are also stored. The processing device 701, the ROM 702, and the RAM 703 are connected to each other via a bus 704. An input/output (I/O) interface 705 is also connected to the bus 704.

In general, the following devices may be connected to the I/O interface 705: an input device 706 including, for example, a touch screen, a touch pad, a keyboard, a mouse, a camera, a microphone, an accelerometer, a gyroscope, or the like; an output device 707 including, for example, a liquid crystal display (LCD), a speaker, a vibrator, or the like; a storage device 708 including, for example, a magnetic tape, a hard disk, or the like; and a communication device 709. The communication device 709 may allow the electronic device 700 to communicate wirelessly or wired with other devices to exchange data. While FIG. 7 illustrates the electronic device 700 having various means, it is to be understood that not all of the illustrated means are required to be implemented or provided. More or fewer devices may alternatively be implemented or provided.

In particular, the processes described above with reference to the flowcharts may be implemented as computer software programs in accordance with embodiments of the present disclosure. For example, embodiments of the disclosure include a computer program product including a computer program carried on a non-transitory computer-readable medium, the computer program including program code for performing the method as shown in the flowchart. In such an embodiment, the computer program may be downloaded and installed from the network through the communication device 709, installed from the storage device 708, or installed from the ROM 702. When the computer program is executed by the processing device 701, the described functions defined in the method according to the embodiment of the present disclosure are executed.

The electronic device provided in the embodiments of the present disclosure and the method provided in the embodiments of the present disclosure belong to the same inventive concept, and the technical details not described in the embodiments of the present disclosure may refer to the embodiments of the present disclosure, and the embodiments of the present disclosure and the embodiments of the present disclosure have the same beneficial effects.

Embodiments of the present disclosure further provide a computer readable medium. The computer readable medium stores an instruction or a computer program, and when the instruction or the computer program runs on a device, the device is enabled to execute any implementation of the method provided by the embodiments of the present disclosure.

It would be appreciated that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that may contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may also be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

In some embodiments, clients, servers may communicate using any currently known or future developed network protocol such as HTTP (hypertext transfer protocol) and may be interconnected with digital data communication (e.g., a communication network) in any form or medium. Examples of communication networks include a local area network ('LAN'), a wide area network ('WAN'), an internetwork (e. g., the Internet), and a peer-to-peer network (e. g., an ad hoc peer-to-peer network), as well as any currently known or future developed network.

The computer readable medium may be included in the electronic device, or may exist separately and not be installed in the electronic device.

The computer readable medium bears one or more programs, and when the one or more programs are executed by the electronic device, the electronic device may execute the method.

Computer program code for carrying out operations for aspects of the present disclosure may be written in any combination of one or more programming languages, including, but not limited to, an object oriented programming language such as Java, Smalltalk, C++ or the like and conventional procedural programming languages, such as the 'C' programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It would be appreciated that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units involved in the embodiments of the present disclosure may be implemented through software or hardware. The name of a unit/module does not constitute a limitation to the unit itself in a certain case.

The functions described herein above may be performed, at least in part, by one or more hardware logic components. For example, without limitation, exemplary types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

It would be appreciated that, the embodiments in this description are described in a progressive manner, each embodiment focuses on a difference from other embodiments, and reference may be made to each other for the same or similar parts between the embodiments. Since the system or apparatus disclosed in the embodiments corresponds to the method disclosed in the embodiments, the description thereof is relatively simple, and for the relevant parts, reference may be made to the description of the method.

It would be understood that in the present disclosure, 'at least one' means one or more, 'a plurality' means two or more, 'and/or'. The association relationship used for describing the associated object indicates that three relationships may exist. For example, 'A and/or B' indicates that only A exists, only B exists, and both A and B exist, where A and B may be singular or plural. The character '/' generally represents a 'or' relationship between the associated objects, and 'at least one (one)' or an analogous expression thereof refers to any combination of these items, including any combination of a singular item (one) or a plural item (one). For example, at least one (one) of a, b or c may represent: a, b, c, 'a and b', 'a and c', 'b and c', or 'a and b and c', in which a, b and c may be single or a plurality of.

It would be appreciated that, in this specification, relational terms such as first and second are only used to distinguish one entity or operation from another entity or operation, and do not require or imply any actual relationship or sequence between these entities or operations. Furthermore, the terms 'include', 'include', or any other variant thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by 'including a . . . ' does not exclude other same elements existing in a process, a method, an article, or a device that includes the element, unless otherwise specified.

The steps of a method or algorithm described in connection with the embodiments disclosed herein may be embodied directly in hardware, in a software module executed by a processor, or in a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any other form of storage medium known in the art.

It would be appreciated that, in the embodiments of the present disclosure, user sensitive information is not involved, and the user relevant information is obtained, used and determined after being authorized by the user. In an example, before obtaining the information related to the user, a corresponding interface displays prompt information related to the obtaining of the data usage authorization, and the prompt information informs the user of the type, usage range, usage scenario, etc. of personal information related to the present disclosure in an appropriate manner according to relevant legal regulations, so that the user determines whether to agree on authorization based on the prompt information. It would be appreciated that the above notification and obtaining of the user authorization process are merely exemplary, and do not limit the implementation of the present disclosure, and other methods meeting relevant legal regulations may also be applied to the implementation of the present disclosure.

The above descriptions of the disclosed embodiments enable a person skilled in the art to implement or use the present disclosure. Various modifications to these embodiments will be readily apparent to those skilled in the art. The general principles defined herein may be implemented in other embodiments without departing from the spirit or scope of the present disclosure. Accordingly, the present disclosure will not be limited to the embodiments shown herein but is to be accorded the widest scope consistent with the principles and novel features disclosed herein.

What is claimed is:

1. A method of data processing, applied to a data bus in an entity, comprising:

if a change of data occurs in a first service in a plurality of services of the entity, obtaining first update data of the first service, wherein the data bus monitors a database of the first service to detect the change of data;

determining, from a predetermined correspondence, a target task corresponding to the first update data of the first service, the predetermined correspondence indicating a business processing policy of update data of a respective service on the data bus, and the target task comprising at least one second service in the plurality of services and a second operation performed by each of the at least one second service; and performing a corresponding second operation on each of the at least one second service, to cause data on the at least one second service on the entity to match the first update data of the first service, wherein the data bus triggers execution of the target task based on the predetermined correspondence.

2. The method of claim 1, wherein the at least one second service comprises all services on the entity, and the second operation is an operation for broadcasting the first update data; or the at least one second service comprises at least one database on the entity, and the second operation is an operation for saving the first update data; or the at least one second service comprises at least one specified service on the entity, and the second operation is an operation for synchronizing the first update data.

3. The method of claim 1, wherein the method further comprises:

saving update details of the first update data, the update details comprising at least one piece of the following information: an update time, update content, an update operator, or a service in which an update occurs;

in response to a query request, obtaining update details of second update data, the query request comprising at least one piece of information in the update details of the second update data; and displaying the update details of the second update data.

4. The method of claim 1, wherein before the determining, from a predetermined correspondence, a target task corresponding to the first update data of the first service, the method further comprises:

determining the predetermined correspondence based on a business processing logic of each service of the plurality of services and an association relationship between data of the plurality of services, the predetermined correspondence comprising a first correspondence, and the first correspondence comprising a correspondence between the first update data of the first service and the target task.

5. The method of claim 1, wherein before determining, from a predetermined correspondence, a target task corresponding to the first update data of the first service, the method further comprises:

defining a data status for each service of the plurality of services; and establishing a correspondence between a data status change of each service of the plurality of services and a task required to be performed as the predetermined correspondence, the predetermined correspondence comprising a first correspondence, and the first correspondence comprising a correspondence between a status change corresponding to the first update data of the first service and the target task.

6. The method of claim 1, wherein if a change in data occurs in a first service in a plurality of services of the entity, obtaining first update data of the first service comprises:

in response to monitoring a change of data in the database of the first service, determining the first update data based on the changed data in the database of the first service.

7. The method of claim 1, wherein the first service is a producer or consumer of data in the entity, and the at least one second service is a producer or consumer of data in the entity.

8. An electronic device, applied to a data bus in an entity, wherein the electronic device comprises: a processor and a memory;

the memory is configured to store instructions or a program;

the processor is configured to execute the instructions or the program in the memory, to cause the electronic device to perform acts comprising:

if a change of data occurs in a first service in a plurality of services of the entity, obtaining first update data of the first service, wherein the data bus monitors a database of the first service to detect the change of data;

determining, from a predetermined correspondence, a target task corresponding to the first update data of the first service, the predetermined correspondence indicating a business processing policy of update data of a respective service on the data bus, and the target task comprising at least one second service in the plurality of services and a second operation performed by each of the at least one second service; and performing a corresponding second operation on each of the at least one second service, to cause data on the at least one second service on the entity to match the first update data of the first service, wherein the data bus triggers execution of the target task based on the predetermined correspondence.

9. The electronic device of claim 8, wherein the at least one second service comprises all services on the entity, and the second operation is an operation for broadcasting the first update data; or the at least one second service comprises at least one database on the entity, and the second operation is an operation for saving the first update data; or the at least one second service comprises at least one specified service on the entity, and the second operation is an operation for synchronizing the first update data.

10. The electronic device of claim 8, wherein the acts further comprise:

saving update details of the first update data, the update details comprising at least one piece of the following information: an update time, update content, an update operator, or a service in which an update occurs;

in response to a query request, obtaining the update details of second update data, the query request comprising at least one piece of information in update details of the second update data; and displaying the update details of the second update data.

11. The electronic device of claim 8, wherein before the determining, from a predetermined correspondence, a target task corresponding to the first update data of the first service, the acts further comprise:

determining the predetermined correspondence based on a business processing logic of each service of the plurality of services and an association relationship between data of the plurality of services, the predetermined correspondence comprising a first correspondence, and the first correspondence comprising a correspondence between the first update data of the first service and the target task.

12. The electronic device of claim 8, wherein before determining, from a predetermined correspondence, a target task corresponding to the first update data of the first service, the acts further comprise:

defining a data status for each service of the plurality of services; and establishing a correspondence between a data status change of each service of the plurality of services and a task required to be performed as the predetermined correspondence, the predetermined correspondence comprising a first correspondence, and the first correspondence comprising a correspondence between a status change corresponding to the first update data of the first service and the target task.

13. The electronic device of claim 8, wherein if a change in data occurs in a first service in a plurality of services of the entity, obtaining first update data of the first service comprises:

in response to monitoring a change of data in the database of the first service, determining the first update data based on the changed data in the database of the first service.

14. The electronic device of claim 8, wherein the first service is a producer or consumer of data in the entity, and the at least one second service is a producer or consumer of data in the entity.

15. A non-transitory computer-readable medium, applied to a data bus in an entity, wherein the non-transitory computer-readable medium stores instructions or a program which, when run on a processor, cause the processor to perform acts comprising:

if a change of data occurs in a first service in a plurality of services of the entity, obtaining first update data of the first service, wherein the data bus monitors a database of the first service to detect the change of data;

determining, from a predetermined correspondence, a target task corresponding to the first update data of the first service, the predetermined correspondence indicating a business processing policy of update data of a respective service on the data bus, and the target task comprising at least one second service in the plurality of services and a second operation performed by each of the at least one second service; and performing a corresponding second operation on each of the at least one second service, to cause data on the at least one second service on the entity to match the first update data of the first service, wherein the data bus triggers execution of the target task based on the predetermined correspondence.

16. The non-transitory computer-readable medium of claim 15, wherein the at least one second service comprises all services on the entity, and the second operation is an operation for broadcasting the first update data; or the at least one second service comprises at least one database on the entity, and the second operation is an operation for saving the first update data; or the at least one second service comprises at least one specified service on the entity, and the second operation is an operation for synchronizing the first update data.

17. The non-transitory computer-readable medium of claim 15, wherein the acts further comprise:

saving update details of the first update data, the update details comprising at least one piece of the following information: an update time, update content, an update operator, or a service in which an update occurs;

in response to a query request, obtaining the update details of second update data, the query request comprising at least one piece of information in update details of the second update data; and displaying the update details of the second update data.

18. The non-transitory computer-readable medium of claim 15, wherein before the determining, from a predetermined correspondence, a target task corresponding to the first update data of the first service, the acts further comprise:

determining the predetermined correspondence based on a business processing logic of each service of the plurality of services and an association relationship between data of the plurality of services, the predetermined correspondence comprising a first correspondence, and the first correspondence comprising a correspondence between the first update data of the first service and the target task.

19. The non-transitory computer-readable medium of claim 15, wherein before determining, from a predetermined correspondence, a target task corresponding to the first update data of the first service, the acts further comprise:

defining a data status for each service of the plurality of services; and establishing a correspondence between a data status change of each service of the plurality of services and a task required to be performed as the predetermined correspondence, the predetermined correspondence comprising a first correspondence, and the first correspondence comprising a correspondence between a status change corresponding to the first update data of the first service and the target task.

20. The non-transitory computer-readable medium of claim 15, wherein if a change in data occurs in a first service in a plurality of services of the entity, obtaining first update data of the first service comprises:

in response to monitoring a change of data in the database of the first service, determining the first update data based on the changed data in the database of the first service.

* * * * *